: (12) United States Patent
Yamashita et al.

(10) Patent No.: US 9,184,695 B2
(45) Date of Patent: Nov. 10, 2015

(54) TERMINAL BOX FOR SOLAR CELL MODULE, AND SOLAR CELL MODULE INCLUDING THE SAME

(75) Inventors: Mitsuo Yamashita, Ise (JP); Kouki Uchida, Ise (JP)

(73) Assignee: KYOCERA Corporation, Kyoto (JP)

( * ) Notice: Subject to any disclaimer, the term of this patent is extended or adjusted under 35 U.S.C. 154(b) by 938 days.

(21) Appl. No.: 13/318,301

(22) PCT Filed: Jun. 29, 2010

(86) PCT No.: PCT/JP2010/061051
§ 371 (c)(1),
(2), (4) Date: Oct. 31, 2011

(87) PCT Pub. No.: WO2011/001975
PCT Pub. Date: Jan. 6, 2011

(65) Prior Publication Data
US 2012/0048338 A1 Mar. 1, 2012

(30) Foreign Application Priority Data

Jun. 29, 2009 (JP) ................................. 2009-154343

(51) Int. Cl.
*H01R 13/46* (2006.01)
*H05K 5/00* (2006.01)
(Continued)

(52) U.S. Cl.
CPC ...................................... *H02S 40/34* (2014.12)

(58) Field of Classification Search
CPC . H01L 31/042; H01L 31/048; H01L 31/0485; H05K 5/0091
USPC ............ 174/50.51, 50.52, 50.54, 59, 63, 520, 174/549; 361/733; 136/251
See application file for complete search history.

(56) References Cited

U.S. PATENT DOCUMENTS 2,985,333 A * 5/1961 Kirkman ........................ 220/533
3,472,945 A * 10/1969 Trachtenberg .................. 174/53
(Continued)

FOREIGN PATENT DOCUMENTS

CN 101431869 A 5/2009
DE 10-2004001011 A1 9/2004
(Continued)

OTHER PUBLICATIONS

Office Action issued on Jul. 22, 2013 in related CN Patent Application No. 201080015855.1 (together with English translation) in 9 pages.
(Continued)

*Primary Examiner* — Chau N Nguyen
*Assistant Examiner* — Roshn Varghese
(74) *Attorney, Agent, or Firm* — Procopio, Cory, Hargreaves & Savitch LLP (57) ABSTRACT

It is an object of the invention to provide a terminal box for a solar cell module in which a positive terminal and a negative terminal are electrically isolated from each other, an occurrence of a short circuit is reduced, and reliability is enhanced, and a solar cell module including the same. In order to achieve this object, a terminal box for a solar cell module contains terminals configured to derive an output from a solar cell panel to the outside, and includes a container and a lid body covering an aperture of the container. The container includes a first region in which a first terminal configured to connect a first output conductor of the solar cell panel is disposed, a second region in which a second terminal configured to connect a second output conductor of the solar cell panel is disposed, and a partitioning portion provided so as to partition the first region and the second region and including a groove on an aperture surface of the container. The lid body includes a projection contained in the groove.

10 Claims, 12 Drawing Sheets

(51) Int. Cl.
| | |
|---|---|
| *H01J 5/00* | (2006.01) |
| *H01J 15/00* | (2006.01) |
| *H05K 5/06* | (2006.01) |
| *H02G 3/18* | (2006.01) |
| *H02B 1/00* | (2006.01) |
| *H02B 1/26* | (2006.01) |
| *B65D 1/24* | (2006.01) |
| *B65D 1/36* | (2006.01) |
| *B65D 25/04* | (2006.01) |
| *B65D 57/00* | (2006.01) |
| *B65D 85/00* | (2006.01) |
| *H02S 40/34* | (2014.01) |

(56) References Cited

U.S. PATENT DOCUMENTS

| | | | | |
|---|---|---|---|---|
| 4,050,770 | A * | 9/1977 | Rigo | 174/59 |
| 4,260,863 | A * | 4/1981 | Appleton | 218/1 |
| 4,261,465 | A * | 4/1981 | Thomas | 220/533 |
| 4,270,820 | A * | 6/1981 | McMullan et al. | 361/752 |
| 6,108,202 | A * | 8/2000 | Sumida | 361/690 |
| 6,344,612 | B1 * | 2/2002 | Kuwahara et al. | 174/50 |
| 6,927,335 | B2 * | 8/2005 | Lim et al. | 174/50 |
| 2004/0177987 | A1 * | 9/2004 | Yoshikawa et al. | 174/59 |
| 2008/0190477 | A1 * | 8/2008 | Hattori | 174/547 |
| 2009/0272559 | A1 * | 11/2009 | Richter et al. | 174/59 |
| 2010/0218797 | A1 * | 9/2010 | Coyle et al. | 174/520 |

FOREIGN PATENT DOCUMENTS

| | | |
|---|---|---|
| JP | 2004-063651 A | 2/2004 |
| JP | 2004-214528 A | 7/2004 |
| JP | 2008-059931 A | 3/2008 |

OTHER PUBLICATIONS

Office Action dated Nov. 6, 2012, issued in counterpart Japanese Application No. 2011-520928.

International Search Report and Written Opinion dated Oct. 5, 2010, issued for International Application No. PCT/JP2010/061051.

Extended European Search Report dated Jul. 30, 2014 issued by the European Patent Office for Counterpart European Application No. EP 10 794 144.5.

\* cited by examiner

CREEPAGE DISTANCE

F I G. 3 B

SPATIAL DISTANCE

TERMINAL BOX FOR SOLAR CELL MODULE, AND SOLAR CELL MODULE INCLUDING THE SAME

TECHNICAL FIELD

The present invention relates to a terminal box for a solar cell module and a solar cell module including the same.

BACKGROUND ART

Conventionally, a terminal box which is not sealed with a resin (hereinafter, referred to as without-potting) has been proposed for the purposes of reducing the operating procedures and operating time required for manufacturing a terminal box, or reducing infiltration of moisture generated at the interface between a terminal box and a resin filled into the terminal box due to capillary action (for example, Japanese Patent Application Laid-Open No. 2004-63651).

SUMMARY OF THE INVENTION

Problem to be Solved by the Invention

Unfortunately, in the terminal box described in Japanese Patent Application Laid-Open No. 2004-63651, a decrease in outdoor temperature causes the condensation of moisture contained in the air within the terminal box, and the inside of the terminal box is covered with a water film, which may lead to a short circuit.

An object of the present invention is to provide a terminal box for a solar cell module having high reliability in which an occurrence of a short circuit is reduced, and a solar cell module including the same.

Means to Solve the Problem

A terminal box for a solar cell module according to the present invention is a terminal box for a solar cell module that contains terminals configured to derive an output from a solar cell panel to the outside, wherein: the terminal box includes a container and a lid body covering an aperture of the container; and the container includes a first region in which a first terminal configured to connect a first output conductor of the solar cell panel is disposed, a second region in which a second terminal configured to connect a second output conductor of the solar cell panel is disposed, and a partitioning portion provided so as to partition the first region and the second region and including a groove on an aperture surface of the container; and the lid body includes a projection contained in the groove.

A solar cell module according to the present invention includes the terminal box for a solar cell module, and a solar cell panel including a first output conductor electrically connected to the first terminal of the terminal box and a second output conductor electrically connected to the second terminal of the terminal box.

Effects of the Invention

According to the terminal box for a solar cell module and the solar cell module of the present invention, the projection of the lid body is disposed so as to be contained in the groove of the partitioning portion that separates the first region and the second region in which the first terminal and the second terminal are disposed, respectively, which enables to secure a large creepage distance or spatial distance between the first terminal and the second terminal. As a result, insulation between the first terminal and the second terminal is more prone to be secured without upsizing the terminal box itself and/or hermetically sealing with a resin, which reduces the occurrence of short circuit and/or tracking.

BRIEF DESCRIPTION OF DRAWINGS

FIGS. 1A and 1B show an embodiment of a solar cell module according to the present invention, where Part(a) is an exploded perspective view showing a laminated configuration of the solar cell module

FIGS. 2A and 2B show an embodiment of a terminal box according to the present invention, where

FIGS. 3A and 3B are cross-sectional views taken along a line A-A' of FIG. 2B, where FIG. 3A is a view for describing a creepage distance and FIG. 3B is a view for describing a spatial distance.

EMBODIMENT FOR CARRYING OUT THE INVENTION

Figure 1A:
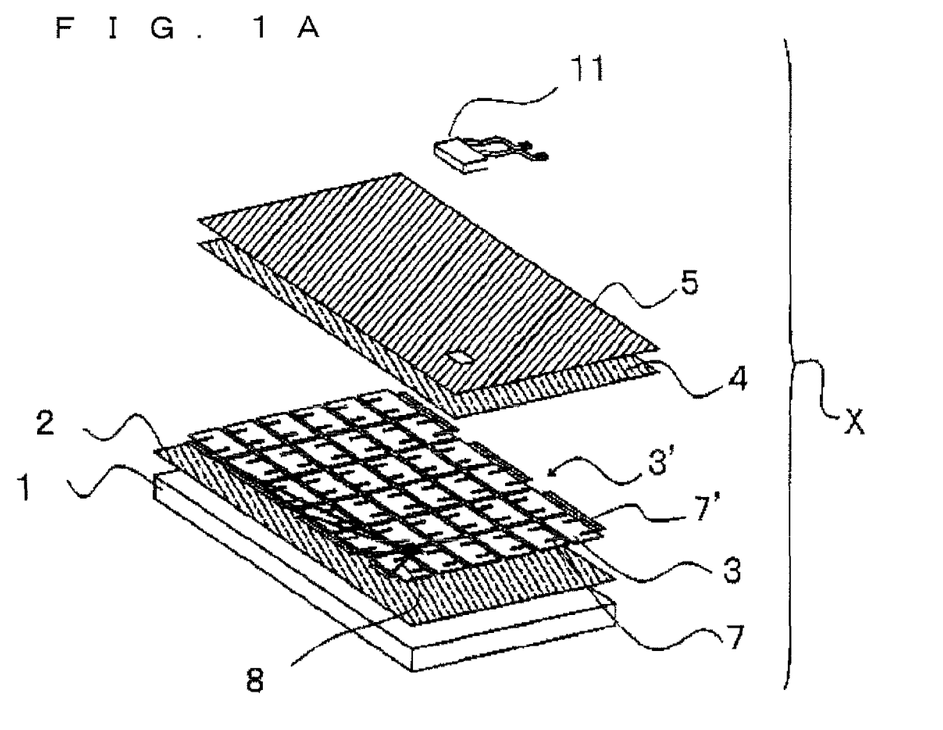
Figure 1B:
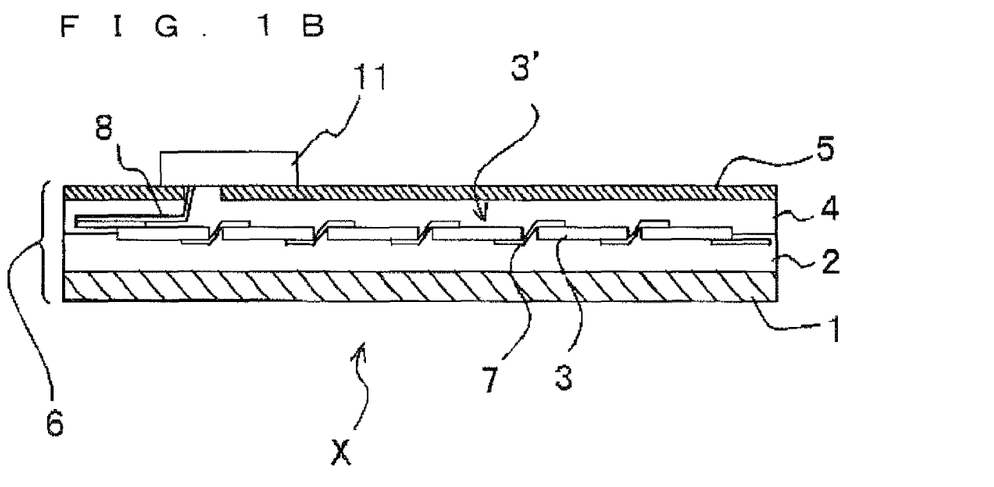
FIG. 1B is a cross-sectional view of the solar cell module.

With reference to FIG. 1, a solar cell module X includes a solar cell panel 6 including light-transmitting substrate 1, a light-receiving surface side filler 2, a plurality of lines of solar cell elements (solar cell matrix 3') comprised of a plurality of solar cell elements 3, a non-light-receiving surface side filler 4 and a back-surface protective member 5 that are layered in order, and a terminal box 11 for deriving the power generated in the solar cell elements 3 to the outside.

For example, a substrate made of glass or a synthetic resin such as a polycarbonate resin is used as the light-transmitting substrate 1. Used as the glass is a glass such as a white glass (for example, quartz glass), a toughened glass, a white toughened glass or a heat-reflecting glass. A white toughened glass having a thickness of approximately 3 mm to 5 mm is preferable in terms of durability. Meanwhile, it is preferable that the thickness be approximately 5 mm in a case of using a substrate made of a synthetic resin such as a polycarbonate resin.

The light-receiving surface side filler 2 and the non-light-receiving surface side filler 4 are made of, for example, an ethylene-vinyl acetate copolymer (hereinafter, ethylene-vinyl acetate copolymer is abbreviated as EVA), and are used in a sheet-like form having a thickness of approximately 0.4 to 1 mm. Those are subjected to heating and pressurizing under reduced pressure by a laminating apparatus and are fused together, thereby being integrated with other member. A transparent EVA may be used for the light-receiving surface side filler 2. A transparent EVA may be used for the non-light-receiving surface side filler 4, or a titanium oxide, a pigment or the like is added to an EVA to be colored in, for example, white in accordance with an installation condition around the solar cell module.

For example, a substrate that is made of single crystal silicon or poly-crystal silicon and has a thickness of approximately 0.3 to 0.4 mm is used for the solar cell element 3. Other than the above-mentioned silicon substrate, a thin film type made of amorphous silicon or the like layered on a light-transmitting substrate, and a compound type made of CIGS or the like may be selected. A PN junction is formed in the solar cell element 3, and electrodes are provided respectively on a light-receiving surface and a non-light-receiving surface thereof. Further, an antireflection film may be provided on the light-receiving surface. For example, the solar cell element 3 has a size of approximately 100 to 150 mm per side in a case of poly-crystal silicon. The above-mentioned solar cell elements 3 are electrically connected in series or in parallel by means of connecting wires 7 to form a linear solar cell string. The solar cell strings are electrically connected by means of connecting wires 7' in matrix to form the solar cell matrix 3'.

The shape, material and the like of the connecting wires 7 and 7' are not particularly limited as long as those are capable of electrically connecting the solar cell elements 3 to each other. For example, it is preferable that one obtained by coating the entire surface of a copper foil having a thickness of approximately 0.1 mm and a width of 2 mm to 4 mm with a solder is cut into a predetermined length and soldered to, for example, the electrode of the solar cell element 3.

The back-surface protective member 5 has a function of reducing infiltration of moisture into the inside of the solar cell panel, for example, into the solar cell elements 3, the light-receiving surface side filler 2 and the non-light-receiving surface side filler 4. For example, a fluorine resin sheet having weatherability that is sandwiched between aluminum foils or a polyethylene terephthalate (PET) sheet on which alumina or silica is vapor-deposited is used as the back-surface protective member 5.

The solar cell panel 6 includes an output conductor 8 (first output conductor 8a and second output conductor 8b) for deriving the output from the solar cell elements 3 (solar cell matrix 3') to the outside. The output conductor 8 has a function of conducting the power generated by the solar cell elements 3 to the terminal box 11. The shape, material and the like of the above-mentioned output conductor 8 are not particularly limited as long as electrical connection is achieved. For example, in a preferably manner, one obtained by coating an entire surface of a copper foil having a thickness of approximately 0.1 mm and a width of approximately 2 mm to 4 mm with a solder is cut into a predetermined length, and one end portion and the other end portion thereof are soldered to the connecting wire 7' and the terminal of the terminal box, respectively. The output conductor 8 is extended toward the terminal box 11 from an aperture provided at a predetermined position of the back-surface protective member 5.

The above-mentioned solar cell panel 6 is formed into a single unit by placing one obtained by overlapping the light-transmitting substrate 1, the light-receiving surface side filler 2, the solar cell matrix 3', the non-light-receiving surface side filler 4 and the back-surface protective member 5 in a lamination machine, and performing pressurization while heating at a temperature of approximately 100 to 200° C. for approximately 15 to 60 minutes under a reduced pressure of approximately 50 to 150 Pa. After that, the terminal box 11 is mounted onto the non-light-receiving surface side of the solar cell panel 6, specifically, the back-surface protective member 5, to thereby manufacture the solar cell module X.

An embodiment of the present invention relates to a terminal box for a solar cell module, which contains terminals configured to derive an output from a solar cell panel to the outside, wherein: the terminal box includes a container and a lid body covering an aperture of the container; and the container includes a first region in which a first terminal connected to a first output conductor of the solar cell panel is disposed, a second region in which a second terminal connected to a second output conductor of the solar cell panel is disposed, and a partitioning portion provided so as to partition the first region and the second region and including a groove on an aperture surface of the container; and the lid body includes a projection contained in the groove.

Figure 2A:
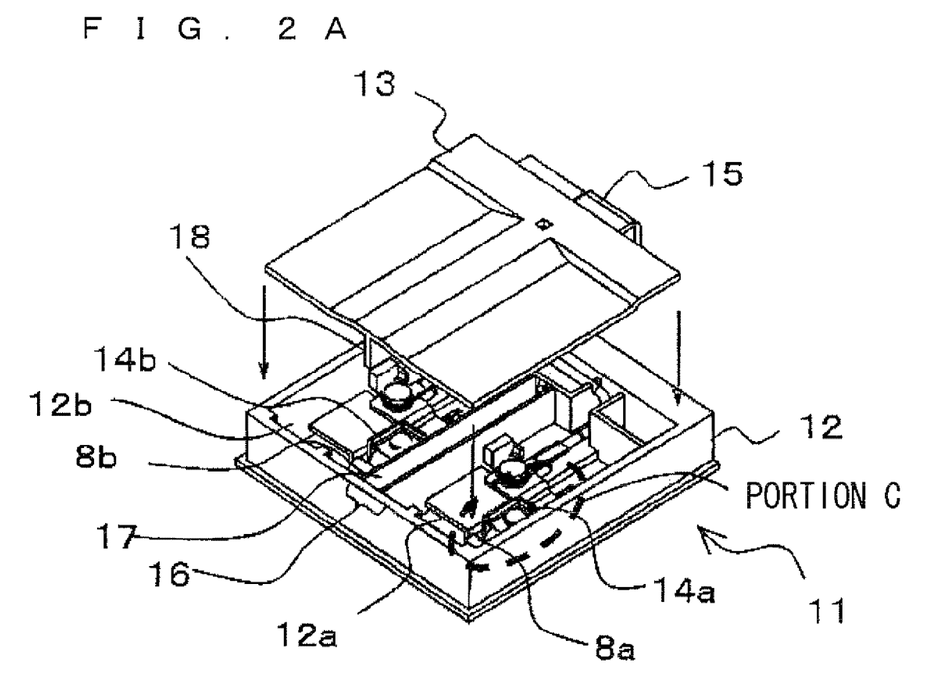
FIG. 2A is an exploded perspective view showing the state of mounting a lid body onto a container constituting the terminal box and FIG. 2B is a perspective view of the terminal box.
Figure 2B:
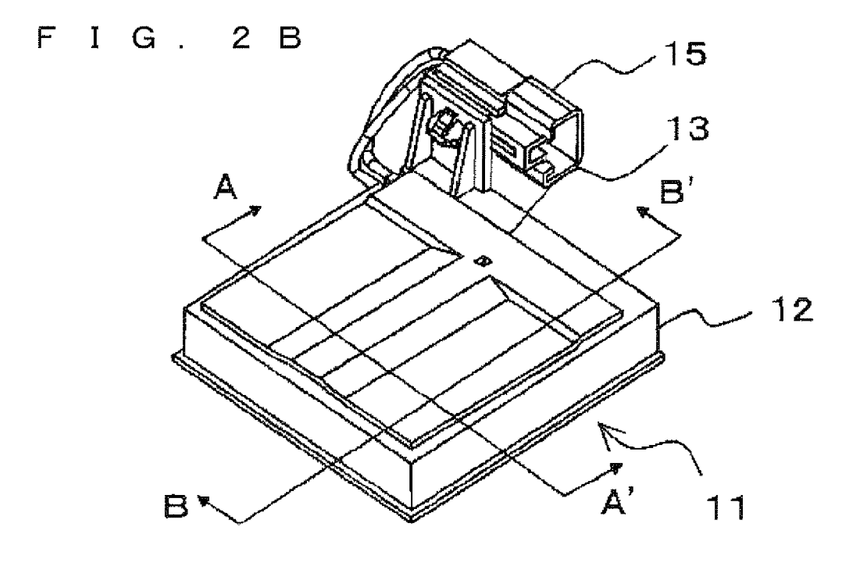

For example, as shown in FIG. 2A, the terminal box 11 includes a container 12 including an aperture (recess) and a lid body 13 that covers the aperture. Further, the container 12 includes a first terminal 14a, a second terminal 14b and a connector 15. The container 12 serves to contain the first terminal 14a, the second terminal 14b and the like. Provided in the container 12 are a first region 12a in which the first terminal 14a is disposed, a second region 12b in which the second terminal 14b is disposed, and a partitioning portion 16 between the first region 12a and the second region 12b. In the present embodiment, the partitioning portion 16 is disposed so as to partition the first region 12a and the second region 12b when the container 12 is viewed in plan view. A groove 17 is formed on a top surface (aperture surface) of the partitioning portion 16. The container 12 is made of, for example, a material having insulating property and for example, is formed of a resin or by die casting to cover the surface thereof with an insulating material such as a rubber. Examples of the resin material include a denatured polyphenylene ether resin (denatured PPE resin), a polyphenylene oxide resin (PPO resin) and an ABS resin. From the viewpoint of enhancing light resistance to ultraviolet light or the like, it is preferable to mix a black pigment into the above-mentioned resin material or color the outer peripheral surface of the container 12 black. The bottom surface side of the container 12 is mounted at a predetermined position on the non-light-receiving surface side of the solar cell panel 6 with, for example, an adhesive. The size and shape of the container 12 may be optimally determined in accordance with the size of a solar cell module onto which the container 12 is mounted. For example, in a case of a solar cell module of 0.3×0.3 [m²] to 3×3 [m²], a rectangular container 12 that is approximately 5 to 15 cm on a side and approximately 1 to 5 cm in thickness and is formed in a square or oblong shape in plan view is used. The arithmetic mean surface roughness Ra of the surface quality of the inner surface of the container 12 is preferably set to be larger than 5 μm from the viewpoint of facilitating dispersion and vaporization of condensation on the inner surface of the container 12. The inner surface of the container 12 is preferably rendered water-repellent by, for example, coating with fluorine from the viewpoint of making is easier to disconnect the conduction between the terminals 14a and 14b due to condensation. In the present embodiment, the partitioning portion 16 and the groove 17 are provided so as to reach two opposed inner side walls of the container 12. This allows the partition between the first region 12a and the second region 12b with more reliability.

Figure 3A:
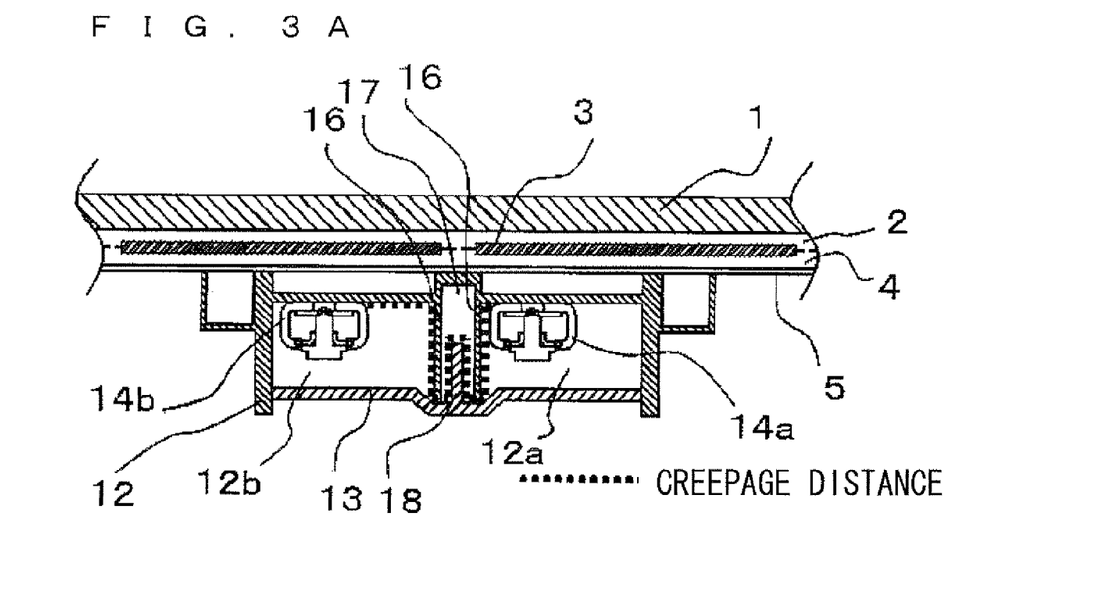
Figure 3B:
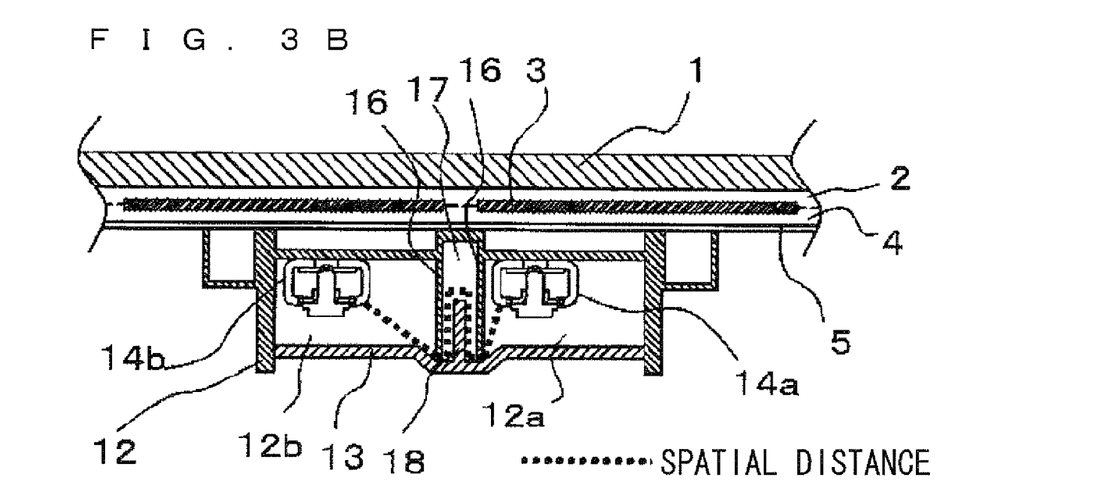
Figure 4A:
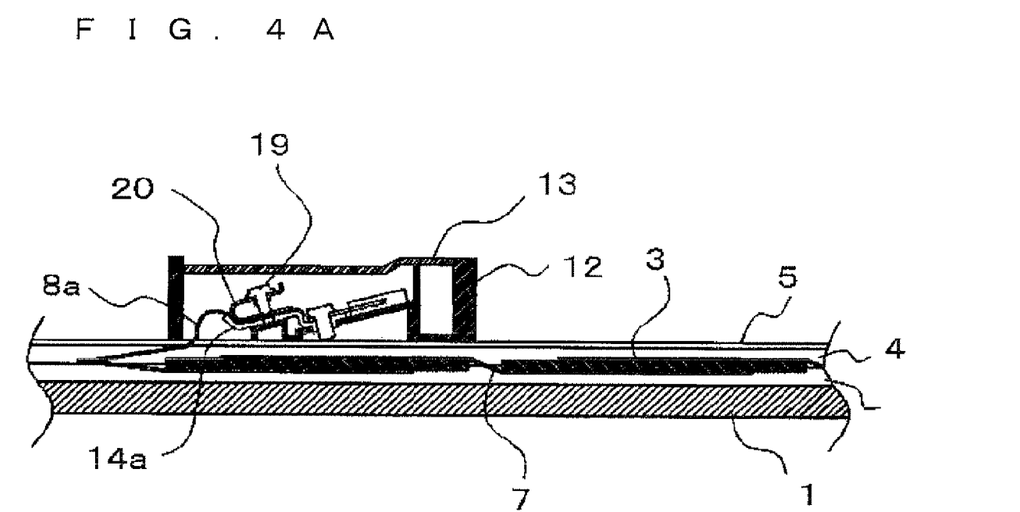
FIG. 4A is a cross-sectional view taken along a line B-B' of FIG. 2B
Figure 4B:
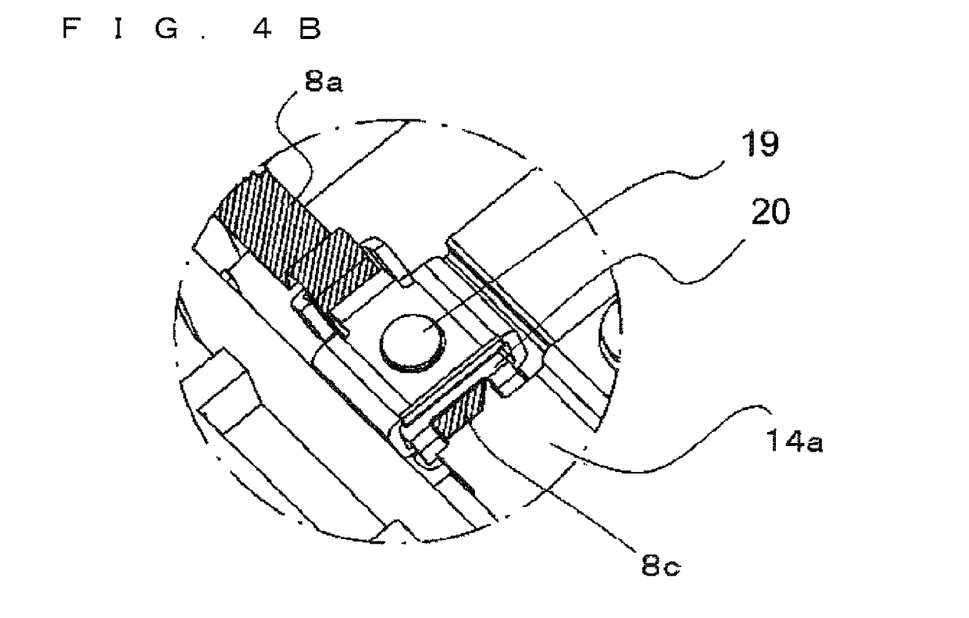
FIG. 4B is an enlarged perspective view of a portion C of FIG. 2A.

The first terminal 14a and the second terminal 14b have polarities different to each other and, for example, the second terminal 14b is negative when the first terminal 14a is a positive. In this case, the first output conductor 8a drawn from the solar cell panel 6 is electrically connected to the first terminal 14a, while the second output conductor 8b is electrically connected to the second terminal 14b. The first terminal 14a and the second terminal 14b are made of copper, phosphor bronze or brass, include connection portions to the output conductor 8 and the connector 15, and are disposed in the first region 12a and the second region 12b of the container 12, respectively. The connector 15 serves to connect the power generated in the solar cell panel 6 to an external load. In the terminal box 11 according to the present embodiment, a projection 18 of the lid body 13 is disposed so as to be contained in the groove 17 of the partitioning portion 16 that separates the first region 12a and the second region 12b in which the first terminal 14a and the second terminal 14a having different polarities are disposed. This enables to secure a large creepage distance and spatial distance between the first terminal 14a and the second terminal, as shown in FIG. 3(a) and FIG. 3(b). That is, in the present embodiment, the projection 18 is contained in the partitioning portion 16 (specifically, groove 17) that partitions the first region 12a and the second region 12b, and as shown in, for example, FIG. 3(a), the creepage distance includes the peripheral surface of the projection 18. Accordingly, the creepage distance in the present embodiment is larger compared with a flat lid body in which the projection 18 is not formed. Therefore, in the terminal box 11, isolation between the first terminal 14a and the second terminal 14b more tends to be secured without upsizing the terminal box itself or hermetically sealing with a resin, which reduces the occurrence of short circuit or tracking. Alternatively, as to the electrical connection between the first terminal 14a and the first output conductor 8a and the electrical connection between the second terminal 14b and the second output conductor 8b, as shown in FIG. 4(a), a screw 19 may be tightened and those may be fixed to be sandwiched between a spring 20 and the terminal 4, besides bonding with a solder. On that occasion, as shown in FIG. 4(b), a tip 8c of the output conductor is allowed to pass through the spring 20 to be visually checked, to thereby reduce operating errors. As a result of the output conductor 8 being disposed while being bent, even when the container 12 is hermetically sealed with a resin, it is possible to change the bending curvature of the output conductor 8 without being hindered by the resin. Accordingly, application of a thermal stress due to thermal expansion and thermal contraction to the output conductor 8 and the like is reduced, which leads to a reduction in the occurrence of a rupture of the output conductor 8 or poor electrical connection between the output conductor 8 and the terminal.

As described above, the lid body 13 is disposed so as to be opposed to the bottom surface of the container 12 and cover the aperture of the container 12. The projection 18 is formed in the lid body 13. This projection 18 is disposed so as to be contained in the groove 17 of the container 12.

Figure 9:
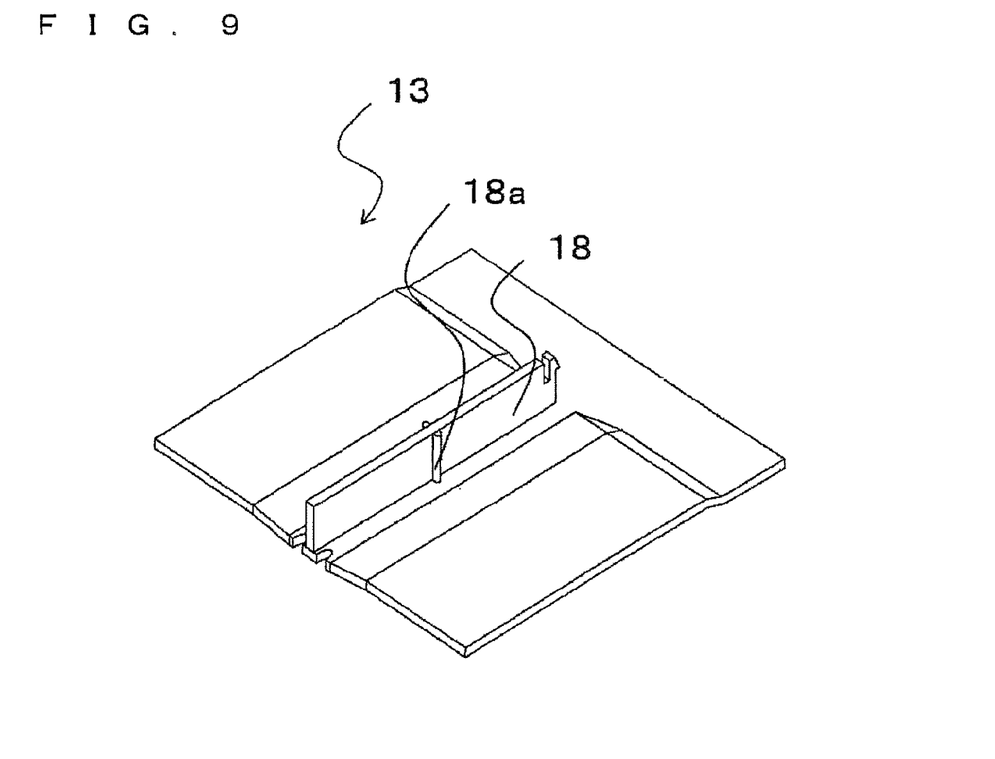
FIG. 9 is a perspective view showing an embodiment of a lid body of the terminal box according to the present invention.
Figure 10:
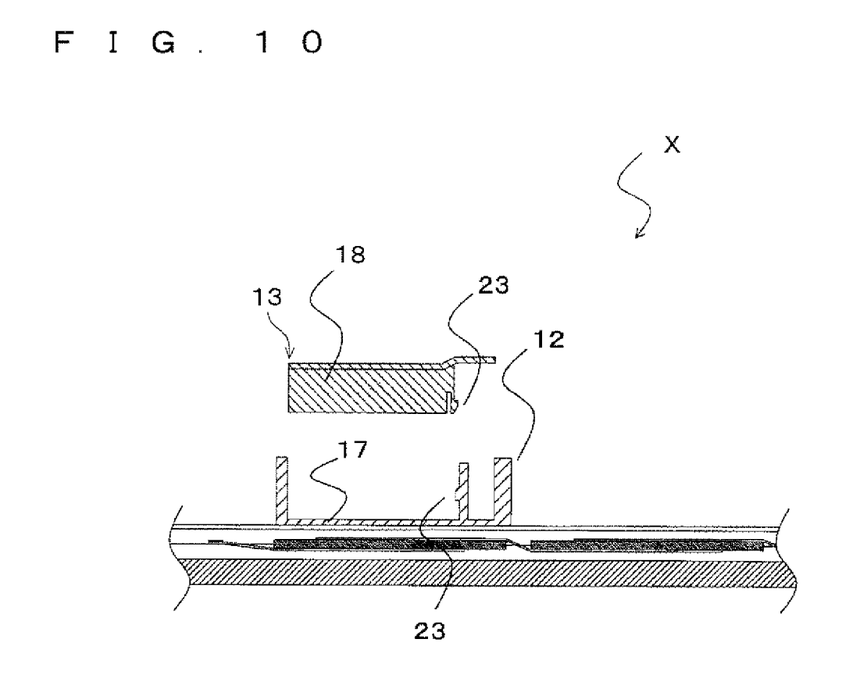
FIG. 10 is an exploded view showing another embodiment of the terminal box according to the present invention.

Further, in the present embodiment, the container is rectangularly shaped when viewed from the aperture surface, and the partitioning portion and the groove are extended so as to reach each of two opposed inner side walls of the container. Moreover, in the present embodiment, the projection is extended so as to reach each of the two opposed inner side walls. For example, the projection 18 is extended at one end portion and the other end portion of the lid body 13, the container 12 has a rectangular shape and is disposed, and the projection 18 reaches the two opposed inner side walls. The above-mentioned configuration makes moving of the condensed moisture difficult. For example, as shown in FIG. 9 and FIG. 10, it is preferable that an engaging piece 23 be provided to at least one end side or the other end side of the projection 18 and that an engaging portion 23' corresponding to the engaging piece 23 be formed on the inner side wall of the container 12 from the viewpoint of fixation and easy attachment/detachment of the container 12 and the lid body 13. The lid body 13 may be fixed to the container 12 by bonding, fitting, screwing or the like. The lid body 13 has insulating property similarly to the container 12 and is typically made of a material similar to that of the container 12.

Figure 5:
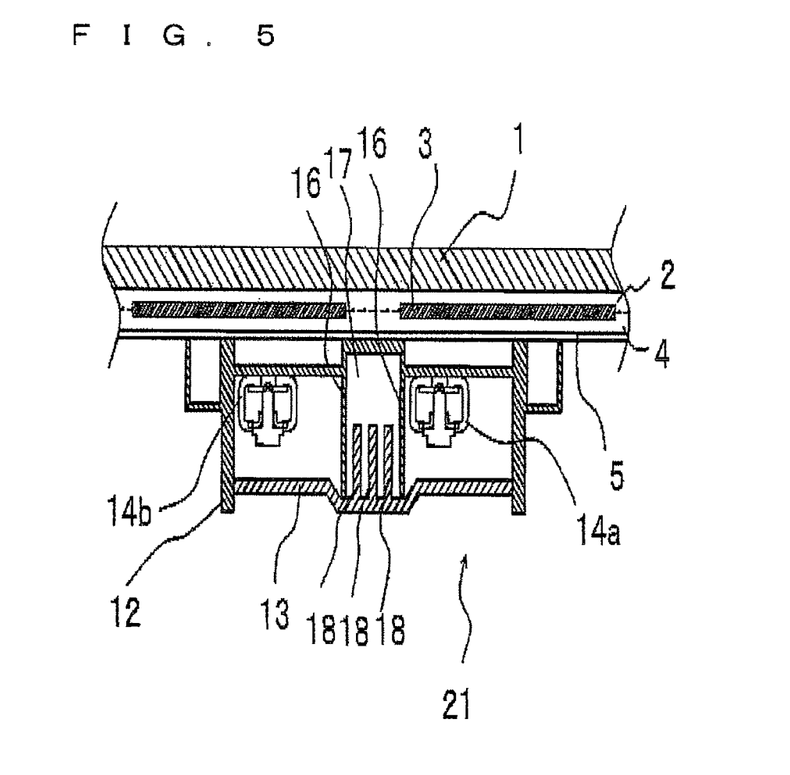
FIG. 5 is a cross-sectional view showing another embodiment of the terminal box according to the present invention.

Further, in the present embodiment, the projection includes a plurality of projections. For example, with reference to FIG. 5, a terminal box 21 is different from the terminal box 11 in that a plurality of projections 18 are provided therein. According to the above-mentioned manner, the creepage distance can be increased further, which allows isolation between the first terminal 14a and the second terminal 14b to be secured more easily. As to the relationship between the width of the groove 17 and the interval between a plurality of projections 18, a plurality of projections 18 can be disposed in the groove 17 in a case of a large width of the groove 17 and small intervals between the projections 18, which enables to increase the creepage distance further. Specifically, it is preferable that the width of the groove 17 be 2 mm or larger so as not to make the contact between the projection 18 and the partitioning portion 16, and that the interval between the projections 18 be 2 mm or larger considering that the projections 18 are more difficult to be rendered conductive by droplets linked together between the projections 18. As to the relationship between the width of the groove 17 and the thickness of the projection 18, a plurality of projections 18 can be disposed in the groove 17 in a case of a large width of the groove 17 and a small thickness of the projection 18, which further increases the creepage distance. Specifically, it is preferable that the width of the groove 17 be 2 mm or larger considering that the partitioning portions 16 are more difficult to be rendered conductive by being linked together, and that the thickness of the projection 18 be 0.2 to 1 mm so as not to come into contact with the partitioning portion 16 inadvertently.

Figure 6:
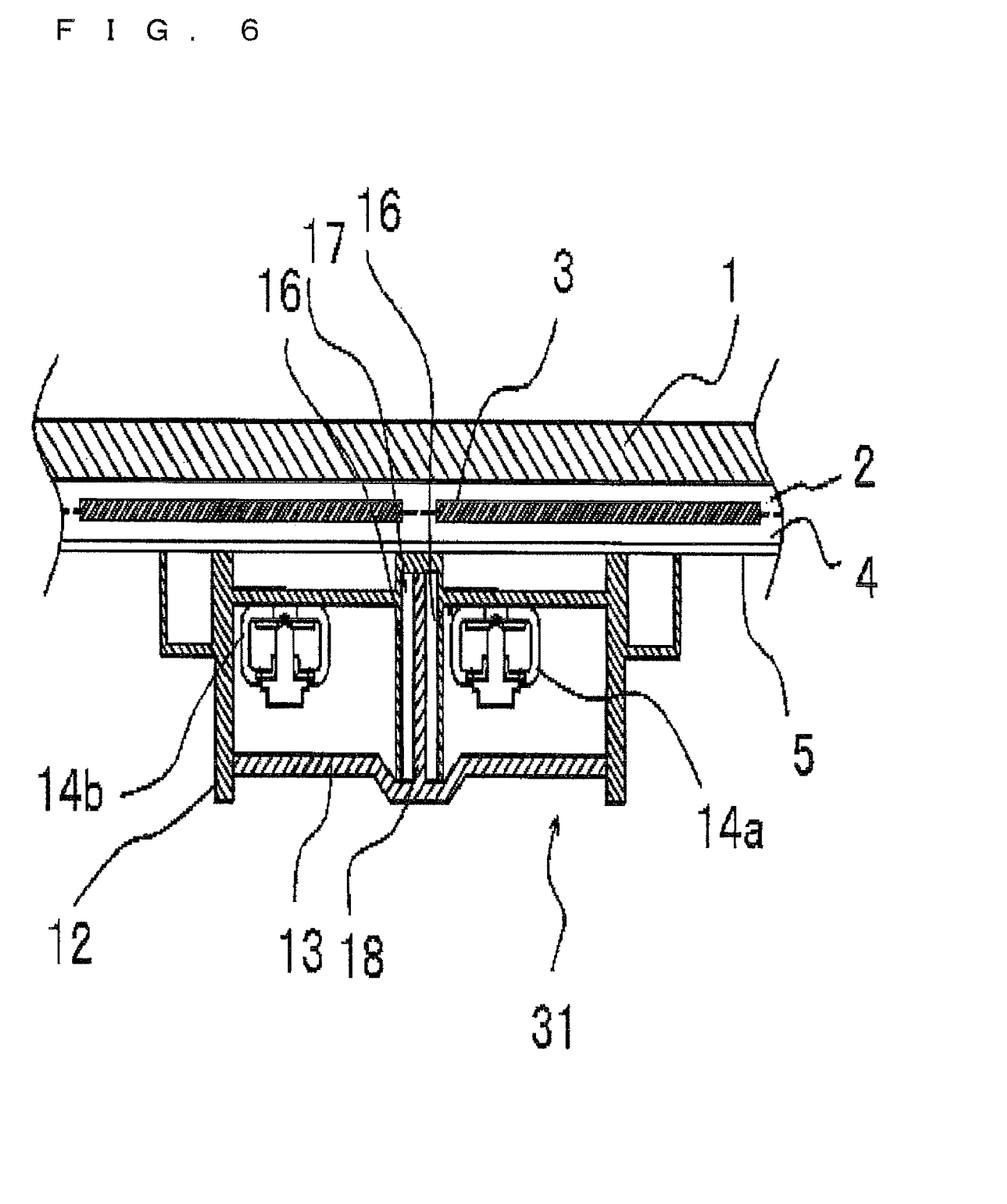
FIG. 6 is a cross-sectional view showing another embodiment of the terminal box according to the present invention.

Further, in the present embodiment, a tip portion of the projection is in contact with a bottom surface of the groove. For example, a terminal box 31 of FIG. 6 is different from the terminal box 11 in that the tip portion of the projection 18 is in contact with the bottom surface of the groove 17. The above-mentioned manner maximizes the height of the projection 18, which leads to an increase of the creepage distance. The entire ridgeline portion at the tip of the projection 18 may be in contact with the bottom surface of the groove 17. As to the depth of the groove 17 and the height of the projection 18, a half or more of the depth of the groove 17 is taken as a reference and, specifically, the depth of the groove 17 is preferably 20 mm or larger and the height of the projection 18 is preferably 10 mm or more. Most preferably, the depth of the groove 17 is approximately identical to the height of the projection 18 in terms of hermetically sealing the container 12 and the lid body 13 and isolation between the terminals thereof.

Figure 7:
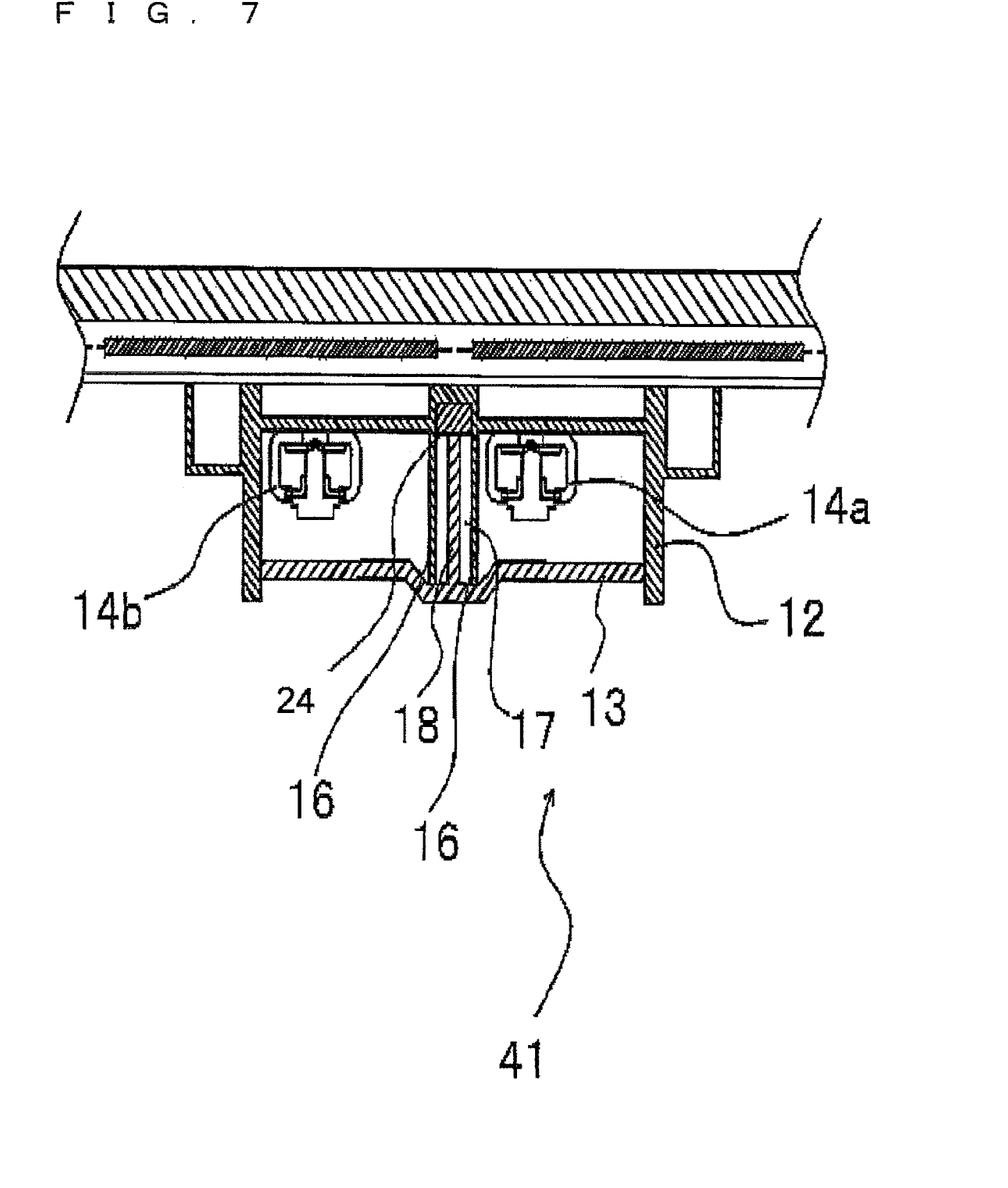
FIG. 7 is a cross-sectional view showing another embodiment of the terminal box according to the present invention.

Further, in the present embodiment, an elastic member is disposed on the bottom surface of the groove, and the tip portion of the projection is in contact with the elastic member. For example, a terminal box 41 of FIG. 7 is different from the terminal box 11 in that the tip portion of the projection 18 is in contact with the elastic member 24 disposed on the bottom surface of the groove 17. The elastic member 24 has insulating property and is preferably made of an elastomeric resin, and examples of the elastomeric resin include silicon rubbers, urethane resins and epoxy resins. The above-mentioned manner enables to reduce a rupture of the projection 18 by coming into contact with the bottom surface of the recess and increase the creepage distance. The above-mentioned elastic member 24 enhances the airtightness between the first region 12a and the second region 12b.

Figure 8:
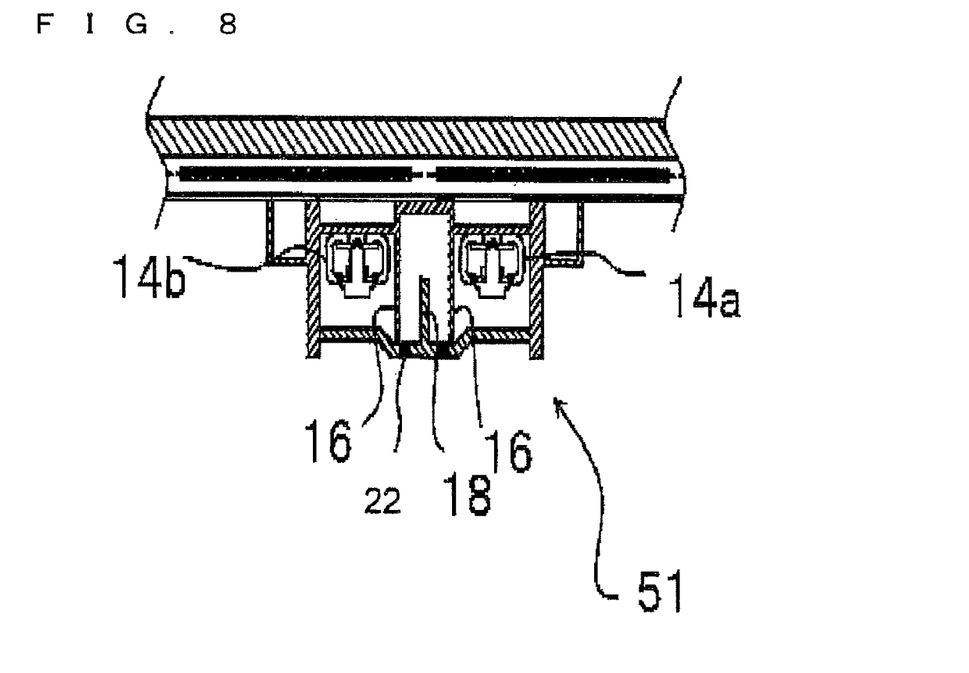
FIG. 8 is a cross-sectional view showing another embodiment of the terminal box according to the present invention.

Further, in the present embodiment, the terminal box for a solar cell module is bonded to the non-light-receiving surface of the solar cell panel. The container is bonded to the solar cell panel on the bottom surface side, which allows water tends to be collected on the lid body 13. Further, the lid body includes penetration holes communicating with the outside between the projection and the partitioning portion. For example, a terminal box 51 of FIG. 8 is different from the terminal box 11 in that penetration holes 22 communicated with the outside are each formed between the partitioning portion 16 and the projection 18 in the lid body 13. The above-mentioned manner allows the water generated in the container 12 due to, for example, the condensation of air to be discharged to the outside through the penetration holes 22, leading to a reduction in the occurrence of short circuit or the like due to moisture. The penetration holes 22 are formed such that the region partitioned from the first terminal 14a and the second terminal 14b, specifically, the inside of the groove 17 of the partitioning portion 16 is communicated with the outside. Accordingly, even if dust or the like comes in from the outside through the penetration hole 22, it is possible to suppress dust or the like from moving to the regions in which the terminals are provided. This results in a reduction of the occurrence of tracking due to dust or the like. The penetration hole 22 preferably has a cone shape in which a diameter thereof becomes smaller from the inside toward the outside thereof in that condensation is more prone to be delivered from the inside toward the outside of the terminal box 11, which is also preferable in that dust is less prone to come into the terminal box 11 from the outside. Specifically, when the diameter of the penetration hole 22 is designed within a range of 2 to 10 mm, it is possible to reduce the occurrence in which water remains in the through hole 22 due to surface tension and water cannot be drained smoothly. When exposed to the weather elements, the number of penetration holes 22 is preferably small, while when not exposed to the weather elements but when the temperature rises dramatically, the number of penetration holes 22 is preferably large. Advantageously, the penetration hole 22 is provided at the region of the lowest position of the lid body 13 in terms of minimizing the number of penetration holes 22.

Figure 11:
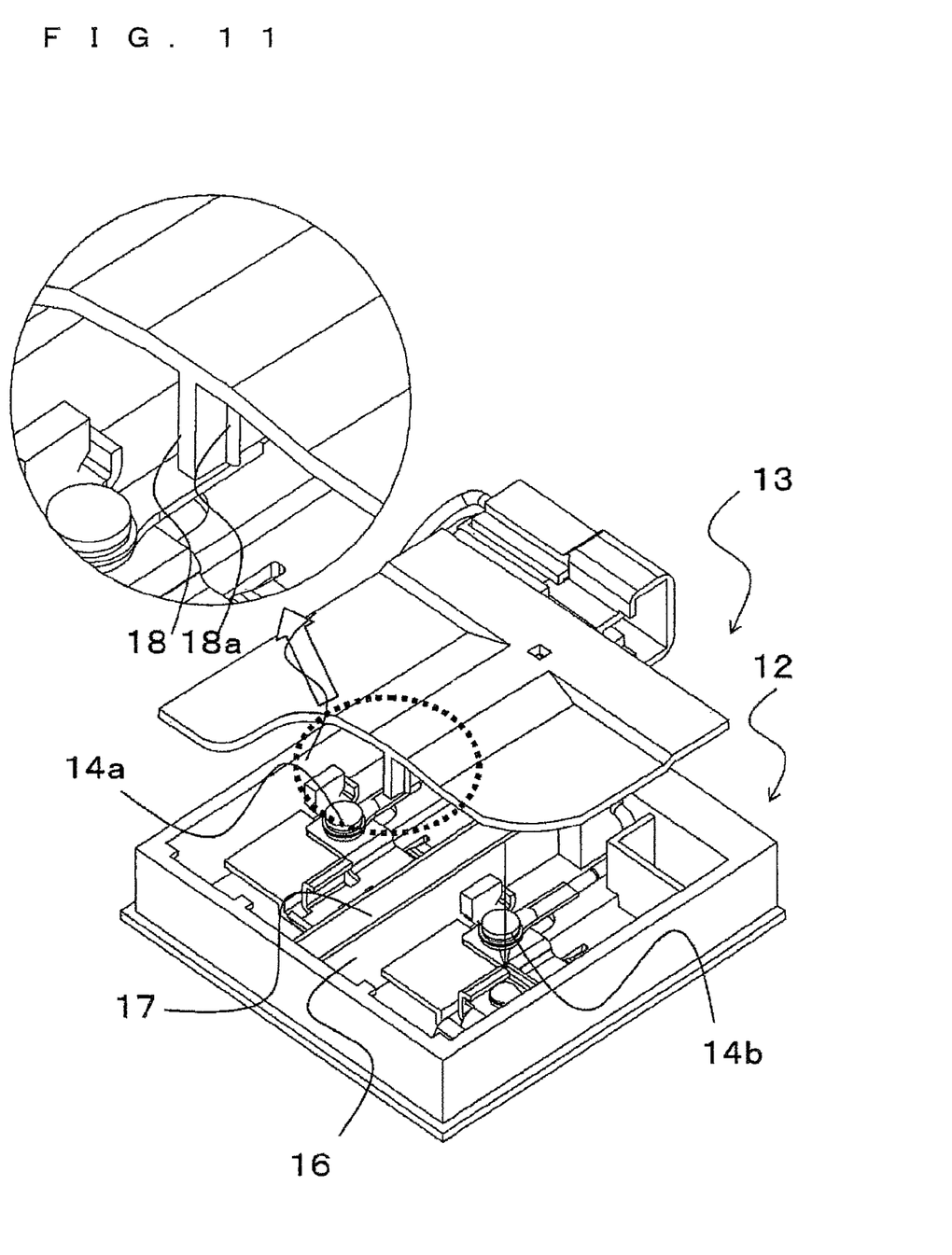
FIG. 11 is an exploded view showing another embodiment of the terminal box according to the present invention.
Figure 12:
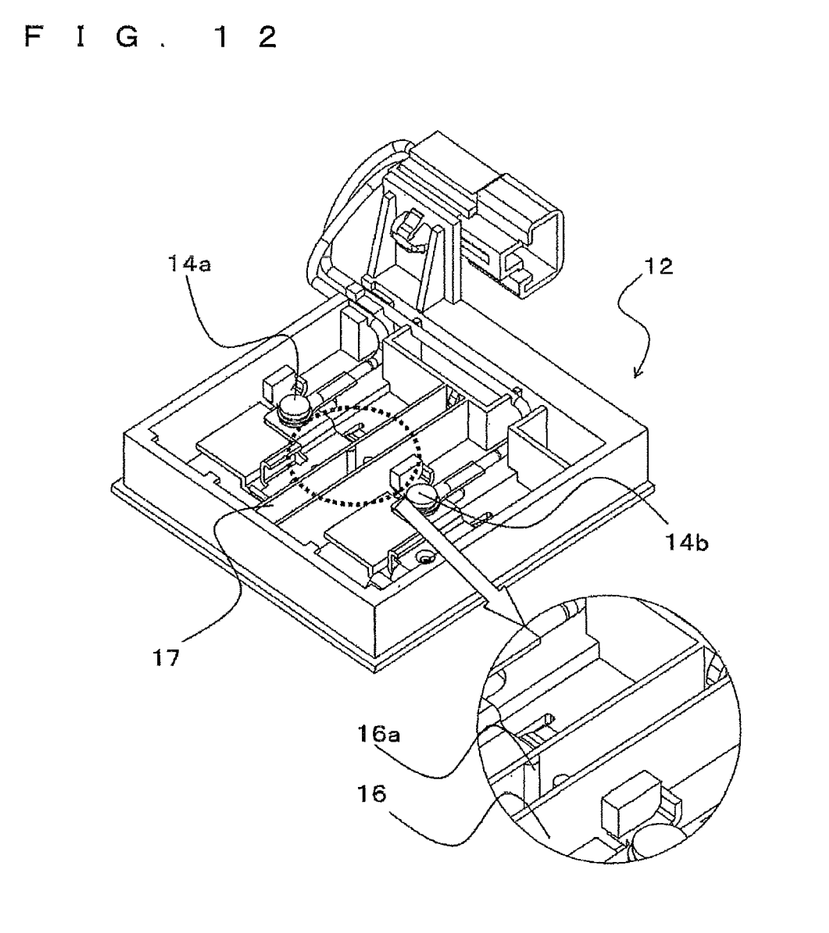
FIG. 12 is a view showing an embodiment of a container of the terminal box according to the present invention.

Further, in the present embodiment, an extending portion is provided to at least one of the side wall of the projection and the inner side wall of the groove, and the projection and the groove are in contact with each other through the extending portion. Moreover, in the present embodiment, the extending portion is provided on the side wall of the projection. As shown in FIG. 9 and FIGS. 11 and 12, the extending portions may be provided to at least one of the projection 18 and the partitioning portion 16 such that the opposed surfaces of the projection 18 and the partitioning portion 16 are partially in contact with each other. With reference to FIG. 9, FIG. 11, FIG. 13A and FIG. 13B, the extending portions are provided to the projection 18, while in FIG. 12, the extending portions are provided to the partitioning portion 16. For example, as shown in FIG. 9, the extending portions are provided to at least one of the projection 18 and the partitioning portion 16 such that the opposed surfaces of the projection 18 and the partitioning portion 16 are partially in contact with each other. This makes centering of the lid body 13 with respect to the container 12 easy while reducing conduction due to capillary action. Further, it is possible to prevent the occurrence of capillary action through the contact between the partitioning portion 16 and the projection 18 due to insufficient centering. The sum of the thickness of the extending portion 18a and the thickness of the projection 18 is preferably equal to the width of the groove 17 in terms of easy attachment/detachment. Specifically, it is preferable that the extending portion 18a have a thickness of 1 to 3 mm, the projection 18 have a thickness of 0.2 to 1 mm, and the groove 17 have the width of 2 mm or larger.

Further, in the present embodiment, the projection and the partitioning portion are extended so as to reach each of the two opposed inner side walls, and the extending portion is provided to at least one of a center portion in an extending direction of the projection and a center portion in an extending direction of the partitioning portion. The extending portions 18a (16a) are preferably provided to at least one of the center portion in the extending direction of the projection 18 and the center portion in the extending direction of the partitioning portion 16. For example, as shown in FIG. 9, the extending portions 18a are provided to the center portion of the projection 18, whereby the container 12 can be formed easily. The container 12 and the lid body 13 can be attached/detached easily by minimizing the contact area therebetween, and the groove 17 can be isolated, which reduces propagation of condensation in the groove 17. Alternatively, the extending portions may be provided to both end portions of the projection 18 or both end portions of the partitioning portion 16. As shown in FIG. 12, the extending portions 16a are provided to the center portion of the partitioning portion 16, which makes it easy to form the lid body 13.

Figure 13A:
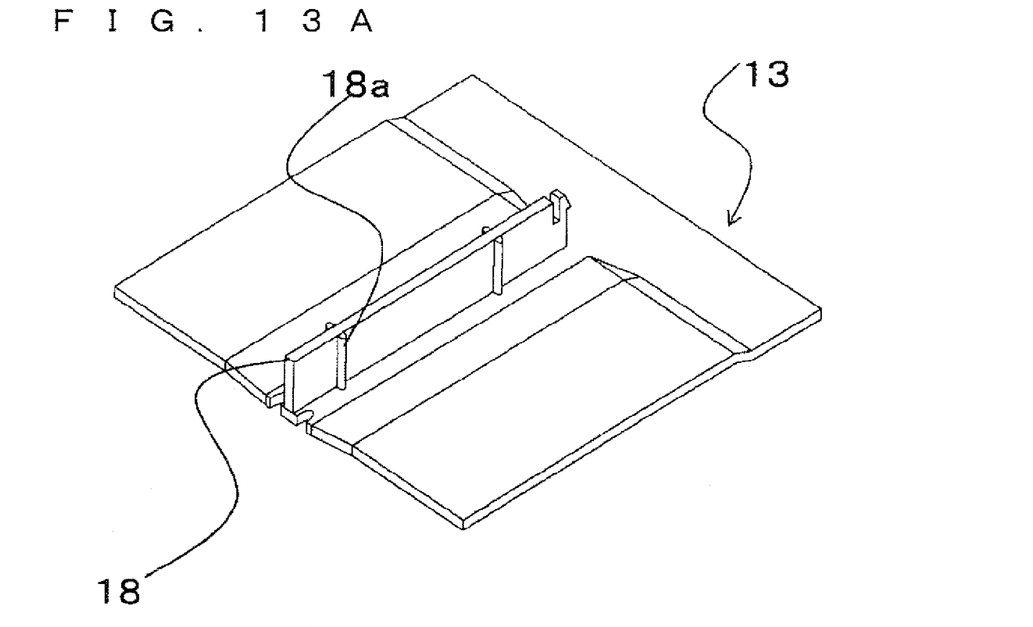
FIGS. 13A and 13B are views showing an embodiment of a lid body of the terminal box according to the present invention.
Figure 13B:
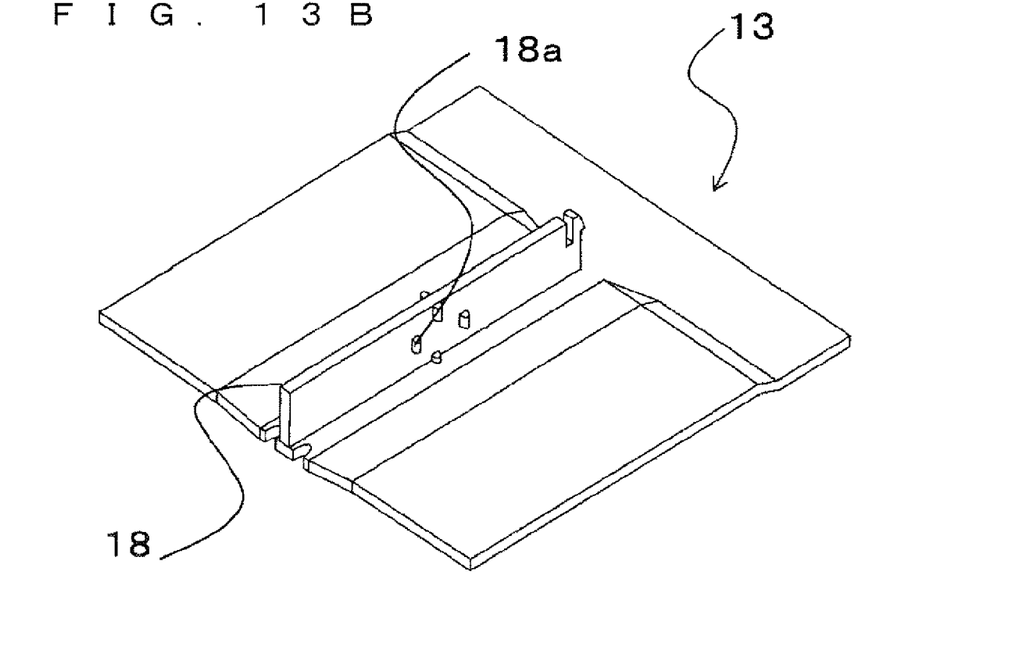

Further, in the present embodiment, the extending portion extends in the projecting direction of the projection. As shown in FIG. 9 and FIG. 11, the extending portion 18a extends in the direction in which the projection 18 projects (toward the bottom of the container 12), whereby the lid body 13 can be easily inserted into the container 12. When the length of the extending portion 18a, the depth of the groove 17 and the height of the projection 18 are identical to each other, the groove 17 can be isolated at both ends, which reduces the propagation of condensation in the groove 17. Besides, for example, the cross-sectional shape of the extending portion and the configuration in a case of including a plurality of extending portions are not particularly limited and, as shown in FIG. 13B, extending portions may be individually provided at a plurality of points.

Further, in the present embodiment, a terminal box for a solar cell module, and a solar cell panel including a first output conductor electrically connected to the first terminal of the terminal box and a second output conductor are included.

The regions (first region 12a and second region 12b) in which two terminals (first terminal 14a and second terminal 14b) are formed are isolated from each other by the partitioning portion 16 in the above-mentioned embodiment. In the present invention, for example, in the case where bypass diodes or the like are further provided other than two terminals, the above-mentioned partitioning portion 16 may be further provided for partitioning in accordance with the number thereof.

DESCRIPTION OF REFERENCE SYMBOLS

X: solar cell module
1: light-transmitting substrate
2: light-receiving surface side filler
3: solar cell element
3': solar cell matrix
4: non-light-receiving surface side filler
5: back-surface protective member
6: solar cell panel
7, 7': connecting wire
8: output conductor
    8a: first output conductor
    8b: second output conductor
    8c: tip of output conductor
11, 21, 31, 41, 51: terminal box
12: container
    12a: first region
    12b: second region
13: lid body
14a: first terminal
14b: second terminal
15: connector
16: partitioning portion
    16a: extending portion
17: groove
18: projection
    18a: extending portion
19: screw
20: spring
22: penetration hole
23: engaging piece
23': engaging portion
24: elastic member

The invention claimed is:

1. A terminal box for a solar cell module, the terminal box comprising:
    terminals configured to derive an output from a solar cell panel to the outside;
    a container; and
    a lid body covering an aperture of the container;
    wherein:
        the container comprises:
            a first region in which a first terminal configured to connect a first output conductor of the solar cell panel is disposed;
            a second region in which a second terminal configured to connect a second output conductor of the solar cell panel is disposed; and
            a partitioning portion provided so as to partition the first region and the second region and including a groove on an aperture surface of the container;
        the lid body includes:
            a projection contained in the groove;
            one surface oriented towards the outside;
            another surface oriented towards the terminals; and
            a penetration hole extending from the one surface to the other surface and communicated with the outside between the projection and the partitioning portion;
    the container is rectangularly shaped when viewed from the aperture surface;
    the partition portion and the groove are extended so as to reach each of the two opposed inner side walls of the container; and
    the terminal box is located on a non-light-receiving surface of a solar cell panel.

2. The terminal box for a solar cell module according to claim 1, wherein the projection is extended so as to reach each of the two opposed inner side walls.

3. The terminal box for a solar cell module according to claim 1, wherein the projection includes a plurality of projections.

4. The terminal box for a solar cell module according to claim 1, wherein a tip portion of the projection is in contact with a bottom surface of the groove.

5. The terminal box for a solar cell module according to claim 1, wherein:
    an elastic member is disposed on a bottom surface of the groove; and
    a tip portion of the projection is in contact with the elastic member.

6. The terminal box for a solar cell module according to claim 1, wherein:
    an extending portion is provided to at least one of a side wall of the projection and an inner side wall of the groove; and
    the projection and the groove are in contact with each other through the extending portion.

7. The terminal box for a solar cell module according to claim 6, wherein the extending portion is provided on the side wall of the projection.

8. The terminal box for a solar cell module according to claim 6, wherein:
    the projection and the partitioning portion are extended so as to reach each of the two opposed inner side walls; and
    the extending portion is provided to at least one of a center portion in an extending direction of the projection and a center portion in an extending direction of the partitioning portion.

9. The terminal box for a solar cell module according to claim 6, wherein the extending portion extends in a projecting direction of the projection.

10. A solar cell module, comprising:
    the terminal box for a solar cell module according to claim 1; and
    a solar cell panel including a first output conductor electrically connected to the first terminal of the terminal box and a second output conductor electrically connected to the second terminal of the terminal box.

* * * * *